United States Patent [19]
Pretet

[11] B 4,010,706
[45] Mar. 8, 1977

[54] TOWED DEVICE FOR MEASURING MAGNETIC FIELD AND THE VERTICAL GRADIENT THEREOF AT SEA

[75] Inventor: Georges Jean-Marie Pretet, St. Renan, France

[73] Assignee: Etat Francais represente par le Delegue Ministeriel pour l'Armement, France

[22] Filed: Dec. 13, 1974

[21] Appl. No.: 532,679

[44] Published under the second Trial Voluntary Protest Program on April 6, 1976 as document No. B 532,679.

[30] Foreign Application Priority Data

Dec. 13, 1973 France .............. 73.44465

[52] U.S. Cl. .................. 114/245; 73/170 A
[51] Int. Cl.² ........................ B63B 21/56
[58] Field of Search ........ 114/235 R, 235 B, 235 F; 73/170 R, 170 A

[56] References Cited
UNITED STATES PATENTS

| | | |
|---|---|---|
| 1,305,483 | 6/1919 | Matsumura .............. 114/235 B |
| 2,401,929 | 6/1946 | Hammond, Jr. .......... 114/235 B |
| 3,062,171 | 11/1962 | Somervile ................ 114/235 B |
| 3,398,715 | 8/1968 | Burg ....................... 114/235 B |
| 3,455,159 | 7/1969 | Gies, Sr. .................. 73/170 |
| 3,461,830 | 8/1969 | Pearce et al. ........... 114/235 F |

Primary Examiner—Trygve M. Blix
Assistant Examiner—Stuart M. Goldstein
Attorney, Agent, or Firm—Stevens, Davis, Miller & Mosher

[57] ABSTRACT

A towed device comprising two fish, carrying measuring apparatus, which must remain vertically aligned during the measurements. The device includes a carrying cable fastened to a relay fish. The fish carrying the measuring apparatus are fastened to the cable and a plurality of fins are placed over the cable to improve the drag. A diving wing pulls the cable so that the device remains vertical. The device may be used for measuring gradients of physical magnitudes at sea and in particular the vertical gradient of the magnetic field.

6 Claims, 5 Drawing Figures

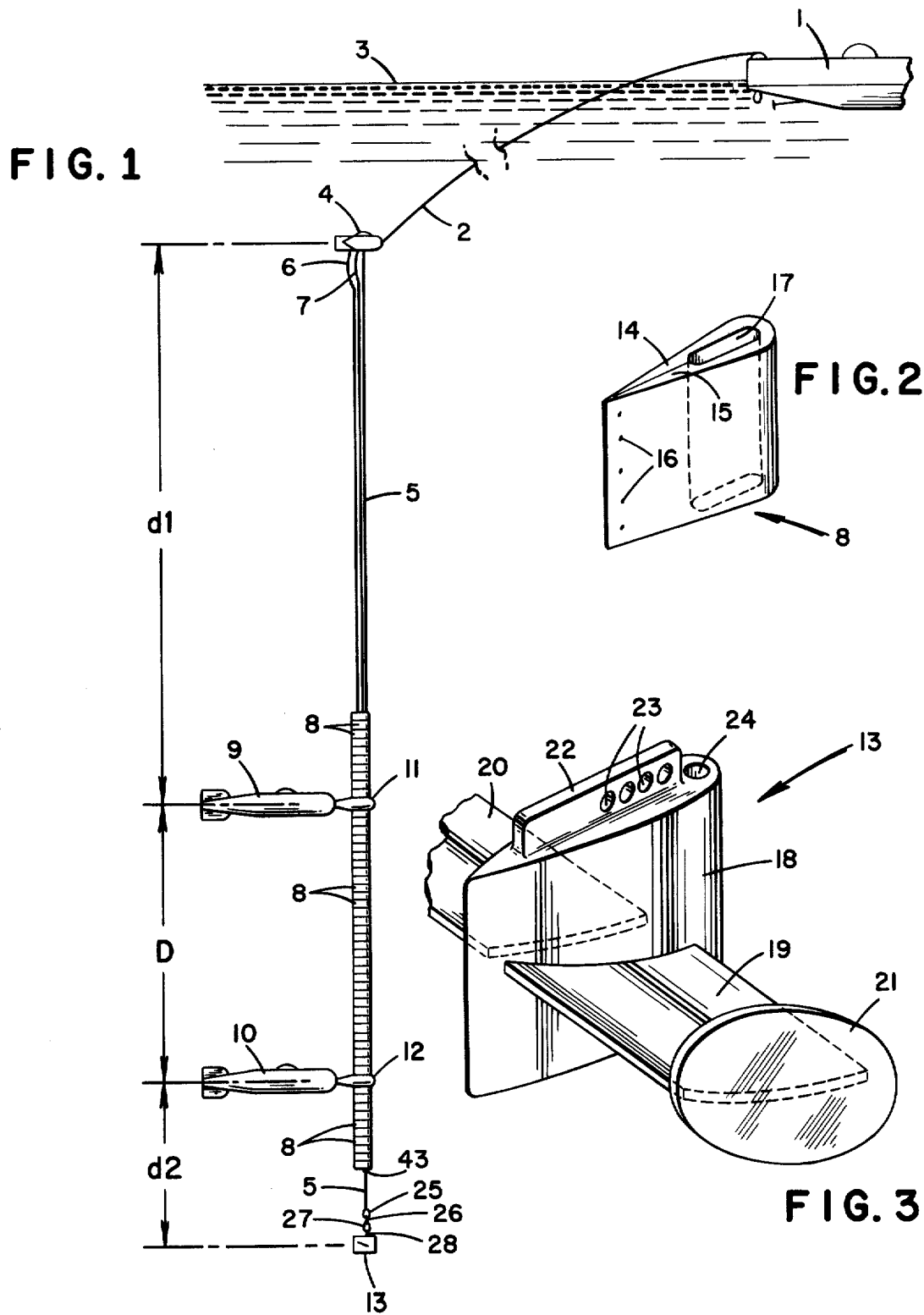

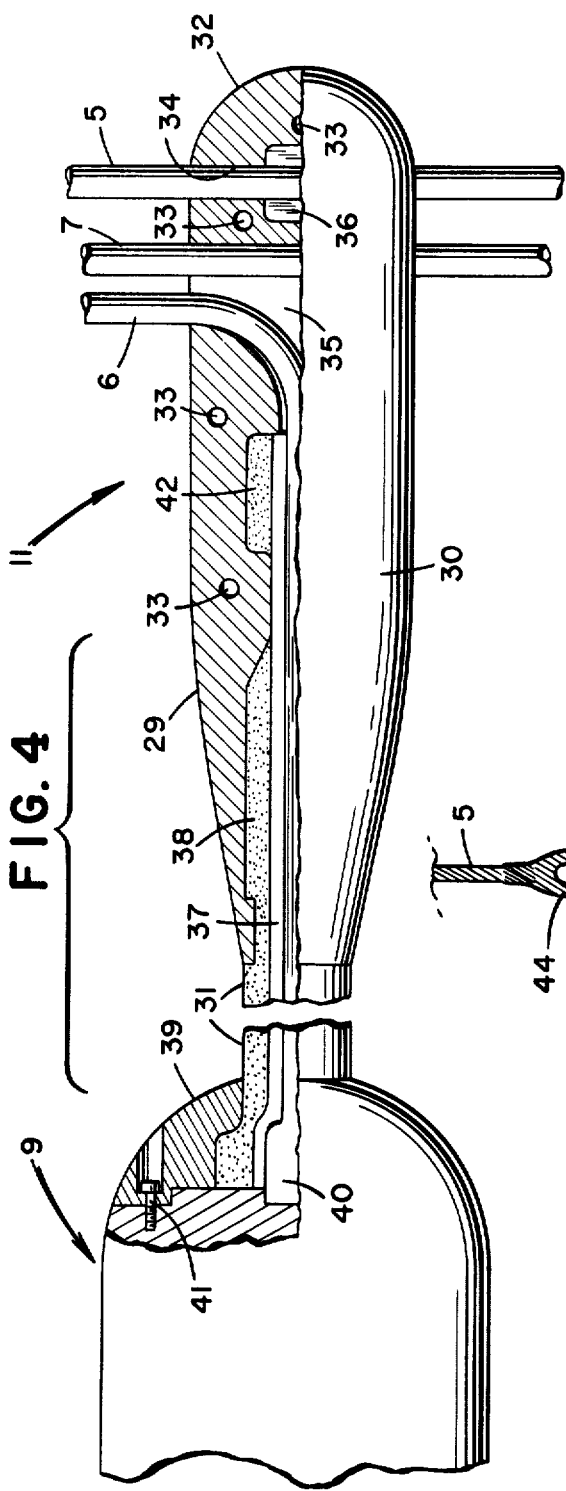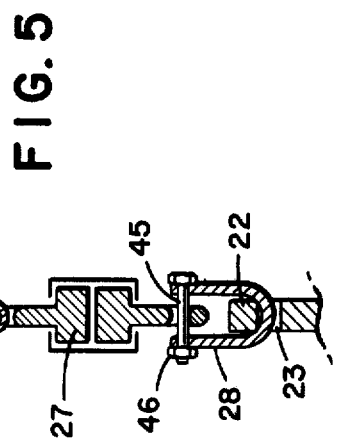

TOWED DEVICE FOR MEASURING MAGNETIC FIELD AND THE VERTICAL GRADIENT THEREOF AT SEA

The present invention relates to a towed device intended for measurements at sea of variable magnitudes such as magnetic field, temperature, salinity etc., and in particular, measurements of the vertical gradient of these variable magnitudes.

It is already known to tow sound devices by means of a cable behind a boat. Depending on the magnitude to be measured, the sounding device may contain a magnetometer, a thermometer, etc. It is known how to determine the depth or altitude of the sounding device as a function of its weight, the length of the tow cable and the speed of the boat. However, the information thus obtained is frequently insufficient to be suitably processed. As a matter of fact, if one considers for instance the magnetic field which is used for the magnetic detection of immersed ferromagnetic objects or for geomagnetic prospecting at sea, it is frequently necessary to draw up, on the basis of the field charts thus obtained, a so-called first derivative chart; that is to say a chart of the vertical gradient of the field. The calculation of this vertical gradient is based on the fact that the magnetic field derives from a potential which may be represented by a harmonic function and on the properties of these functions. These calculations are lengthy and expensive and can in general be carried out only with a time lag. They furthermore are subject to errors which are greater the closer the measurements are effected to the sources.

One object of the present invention is to provide a towed device which makes it possible to obtain in particular direct measurement, without subsequent calculations and in real time, of the vertical gradient of the magnitude to be measured, and at the same time as the measurement of said magnitude if necessary. Another object of the invention is to provide a towed device which comprises two measuring apparatus which, during the measurement, are placed vertically one below the other, the distance between the two apparatus being sufficiently great for the measurement to be significant.

Now, in practice the distance between the measuring apparatus, particularly between two magnetometers, when it is desired to measure the gradient of the magnetic field, may vary from a few meters to about 10 meters. A conventional rigid towed system of such size is not suitable due to the fact that it takes up a prohibitive amount of space on board the towing boat and in view of the difficulties encountered during the handling and towing of the system.

In order to avoid these drawbacks, one object of the invention consists of providing a non-rigid towed device, apart from the measurement apparatus proper, in such a manner that in the transportation position on board the towing vessel the device can be wound up or coiled and that in the towing position it assumes and retains a vertical position for a suitable range of speeds of the towing boat.

Another object of the invention is to provide a towed device whose weight in the static position in or out of the water is far less than the weight of the device when it is towed. It is thus possible to simplify the hoisting and handling members on board the towing boat.

In accordance with one feature of the present invention, a towed device is provided which is intended for measurements at sea of variable magnitudes. The device consists of a flexible carrying cable and a material having a low coefficient of elongation to which there are connected a first and second fish, bearing measuring apparatus, the carrying cable being suspended, directly or indirectly, from the end of a tow cable and bearing at its bottom end a vertically downward pulling member, the first and the second fish being hooked at a given distance apart from each other in the central region of the carrying cable so that their measurements are not affected on the one hand by the tow cable and on the other hand by the pulling member.

In accordance with another feature, streamlined fins are placed over the carrying cable on both sides of the carrying fish and between them to decrease the drag of the cable, the height of each of the fins being such that the carrying cable provided with the fins can be wound or coiled on board the tow vessel.

In accordance with another feature, the system for fastening each fish bearing the measuring apparatus to the carrying cable is relatively flexible and a system of revolution to contribute a slight drag.

In accordance with another feature, the pulling member is a diving island having a weighted fuselage provided on both sides with ailerons at a negative angle of incidence.

Other characteristics will become more evident from a reading of the following description of an illustrative embodiment, the description being given with reference to the accompanying drawings, in which:

FIG. 1 is a schematic profile view of the towed device in accordance with the invention;

FIG. 2 is a perspective view of a streamlined fin intended to be placed on the cable carrying the device of FIG. 1;

FIG. 3 is a partial perspective view of a traction device in accordance with the invention.

FIG. 4 shows, partially in section, fish fastening system in accordance with the invention, and FIG. 5 shows a detail of the suspension members for the traction device.

FIG. 1 shows a tow vessel 1 dragging a tow cable 2 which is immersed below the level of the water 3 and to which there is fastened a relay fish 4 which supports the device of the invention. In the following description, there will be considered more particularly a device intended for measuring the gradient of the magnetic field, although it will become obvious that the device is not limited to this application but can serve for carrying out other measurements such as temperature, salinity, etc.

The device comprises a suspension line or cable 5, two electric signal transmission and power supply cables 6 and 7, a number of fins 8 placed on the cables, two fish 9 and 10 containing magnetometers (not shown) and fastened to the cable 5 by towheads 11 and 12 respectively, and a diving wing 13 connected to the lower end of the cable 5 by a combination of links and swivels.

The cable 5 is of nonmagnetic material and preferably of a synthetic material such as nylon or a material known by the name of "Oroc" of very low coefficient of elongation, the cable being capable of withstanding a load of the order of 2000kg. The cables 6 and 7 feed the fish 9 and 10 respectively with power and pick up the signals given off by the magnetometers of these fish so as to transmit them to the relay fish 4. The cable 6 is connected to the fish 9 via the towhead 11 while the cable 7 descends to the head 12. The conductors of the cables 6 and 7 are of course of nonmagnetic material such as copper, and their covering consists of a conventional synthetic material.

A fin 8 shown in perspective in FIG. 2. It is shaped from a sheet of molded rubber or neoprene, covered with a protective layer of silicone, the sheet terminating in beveled portions 14 and 15 which are connected in the manner that the inner faces of the portions 14 and 15 are applied against each other and sewn through the perforations 16. To the front of the portions 14 and 15 the folded sheet leaves a cylindrical hole 17 which passes through the entire height of the fin 8, this hole being intended for threading the fin 8 on the assembly of the three cables 5, 7 and 6 in this order from the front towards the rear, the width of the hole 17 being substantially equal to the diameter of the suspension cable 5. Thus the fins 8 which are distributed on both sides of the fish 9 and 10 as well as between them have a twofold role, namely first of all to hold the cables together and then, as a result of their streamlined horizontal cross section, together to form a vertical wing which stabilizes the flow of the water in the vicinity of the fish 9 and 10, thereby substantially reducing the drag of the device. The height of the fin 8 is selected large enough not to multiply the number of fins and short enough to permit easily coiling or winding the device on board the tow vessel 1, which then reduces the space taken up by the device and facilitates its handling.

The diving wing 13 is shown in perspective in FIG. 3. It comprises a body or fuselage 18, two symmetrical ailerons 19 and 20, 20, being shown only in part, and two symmetrical vertical stabilizers only one of which, 21, is visible in FIG. 3. The body 18 has a streamlined horizontal cross section in order to decrease the drag of the wing 13 and sufficient height to see to it that the body 18 when moving in the water retains a stable vertical position. The body 18 is provided at its upper portion with a rib 22 provided with transverse holes 23. The body 18 is made of a nonmagnetic light alloy and is hollow, a hole 24 at its upper portion making it possible to weight it with lead. The ailerons 19 and 20 are each formed of a cambered plate which is welded on the one hand to the body 18 and on the other hand to the associated vertical stabilizer 21. The camber of the aileron is concave towards the top and has a profile which can be determined by calculation. In the example described, the wing 13 has for instance a total weight in air of 214 kg, comprising about 164 kg of lead and about 50 kg for the body 18, the ailerons and the vertical stabilizers, the latter being also made of nonmagnetic alloy. There is thus obtained a weight in water of about 190 kg in a static condition. When the wing is towed at a speed of 8 knots, the vertical traction of the ailerons 19 and 20 adds on to this weight to give a total resultant traction of about 600 kg, which, in view of the small drag of the device, assures in practice its vertical position at this speed.

The vertical stabilizers 21 have the purpose of stabilizing the flow of water between them and the body 18 so as to assure constant traction of the ailerons 19 and 20. A plurality of holes 23 is provided which makes it possible to vary the angle of incidence of the ailerons; that is to say, their vertical traction, if necessary.

It should be noted that the vertical traction of 600 kg could be obtained by using a merely streamlined lead weight. However, in a static condition, the weight thereof would always be 600 kg and even greater in air. Such a mass would be difficult to transport on the tow vessel, the hoisting gear and other handling equipment of which would have to be considerably strengthened.

This is the reason why, in the preferred device of the invention, there is employed a wing whose static weight is only about 200 kg. It is obvious that all the edges of the portions of the wing 13 are rounded.

The diving wing 13 is suspended from the suspension cord or cable 5 by a link 25, a breakable keeper 26, a swivel 27 and a link 28, as shown in FIG. 1.

FIG. 4 shows the towhead 11 of the fish 9. It comprises a head proper formed of two half shells 29 and 30, and of a flexible connecting neck 31, connecting the rear of the head to the front of the fish 9. In FIG. 4, the upper half of the shell 30 has been removed to show the upper inner face of the half shell 29. It can be noted that the two half shells connected along a vertical diametrical plane form a head whose front 32 is spherical, whose central portion is substantially cylindrical and whose rear portion tapers down to produce continuity with the cylindrical neck 31. The two half shells 29 and 30 are connected by bolt-nut systems passing through the holes 33. The half shells are symmetrical and have hollow spaces 34 and 35 on their inner faces. The hollow space 34 provides s space for the suspension rope or cable 5 which passes vertically through the head from one side to the other, as well as a stop knob 36 spliced on the rope 5 in a conventional manner. The hollow space 35 makes it possible to house the cables 6 and 7, the cable 6 being deflected horizontally towards the rear while the cable 7 passes vertically throughout the fish. The hollow space 35 also contains the front end of the neck 31, assuring the fastening of this end between the half shells 29 and 30. The neck 31 whose cylindrical intermediate portion has been shown only in part is provided, around the cable 6, with two cylindrical coverings 37 and 38. The covering 37 consists of a relatively flexible material which directly protects the cable 6 from excessive twist. The covering 38, which is around 37 is of a material which is also flexible but which is of greater hardness and of sufficient strength to assure the traction of the fish 9. The ends of 37 and 38 are flared to permit their hooking respectively to the shell 29–30 on the one hand and the front of the fish 9 on the other hand. The front of the fish 9 comprises a portion 39 of the cylindrical outer surface having recesses to contain the flarings of 37 and 38 as well as an electric socket 40 which terminates the cable 6. Screws 41 permit the mounting of the portion 39 on the fish 9. The front end of the covering 37 penetrates deeper than 38 into the shell 29–30 and is surrounded by a sleeve 42 which assures its position with respect to the entrance elbow of the cable 6.

The fish proper 9 and 10 can be entirely conventional and contain any suitable apparatus or magnetometer provided that they have an electric outlet which connects with 40. Their shape is hydrodynamic as far as possible. It should be noted that the fastening head of the invention, which is very different from the conventional yoke fastening systems such as that shown in French Patent No. 2,035,709, makes it possible substantially to reduce the drag of the fish. This improvement, combined with the improvement contributed by the vertical wing formed of the assembly of fins 8 assures on the one hand less drag and therefore better verticality of the entire device and on the other hand better conditions of navigation for the fish 9 and 10 which navigate practically horizontally, which is very important for the precision of the measurements.

It will be noted that the verticality of the device and the horizontal position of the fish are two essential conditions for the measurements of vertical gradient of a variable magnitude. It will be noted that in FIG. 1 ailerons are not provided up to the top of the cable 5. It is, as a matter of fact, sufficient for the two above mentioned conditions to be satisfied in the vicinity of the fish. Above the fins 8, the cables 6 and 7 are tied onto the cable 5, while retaining the necessary slack at their upper ends. The distance between the fish 9 and 10 on the one hand and the relay fish 4 on the other hand must be sufficiently large so that the steel of the armature of the tow cable 2 does not affect the magnometers of fish 9 and 10. In order to measure other magnitudes, different distances could be provided. The relay fish 4, which may be conventional, makes it possible, inter alia, to establish the connection between the conventional coaxial cable of the tow cable 2 and the two cables 6 and 7 and possibly the multiplexing of the signals and the distribution of the power supply.

FIG. 5 shows a vertical section through the members for the suspension of the diving wing 13, these members having already been indicated in FIG. 1. The suspension rope 5 terminates in a spliced thimble 44 which surrounds the end of a link 25. To the bottom of the link 25 there is suspended a breakable keeper 26 which is formed of a short length of cable provided with thimbles at each end and dimensioned to give under a pull of 1500 kg in the event that the wing 13 should hook itself on the bottom. In this way, in case of hooking, one would lose only the wing 13 but not the entire device. The lower thimble of the breakable keeper 26 bears the upper ring of a swivel 27 which is preferably a conventional swivel with balls (not shown). The lower ring of the swivel 27 bears a shackle 28 from which the wing 13 is suspended through a hole 23 in the rib 22. The shackle 28 is provided with a fastening system formed of a bolt 45 and a nut 46. It should be noted that all of these parts are made of nonmagnetic material so as not to distort the measurements.

The mounting of the device is very simple. Once the wing 13 has been fastened to the cable 5, a first series of fins 8 is placed on top of the stop knob 43. Thereupon by means of the bolt-nut systems provided, the two half shells 29 and 30 of the head 12 are fastened on cable 5 and on the neck 31 of fish 10. Thereupon, a second series of fins 8 are placed on 5 and 7. The head 11 is assembled in the same way as head 12. The third series of fins are placed on cables 5, 6 and 7. Finally the cables 6 and 7 are connected to the fish 4 and the cable 5 attached to it.

The distance D between the fish 9 and 10, which distance may change with the number of fins 8 of the second series, is selected as a function of the measurements to be made. For measurements of magnetic fields, for instance, it is about 5 meters. The distance d1 between the relay fish 4 and the fish 9 on the one hand and the distance d2 between the fish 10 and the wing 13 on the other hand are adjusted in such a manner as to produce as little disturbance as possible for the magnetometers and assure good navigation of the fish 9 and 10.

Although the principles of the present invention have been described above in connection with a specific embodiment it will be understood that this description has been given merely by way of illustration and does not limit the scope of the invention.

What is claimed is:

1. A towed device for measuring at sea variable magnitudes, comprising: a flexible carrying cable including a material having a low coefficient of elongation, a first and a second fish attached to said carrying cable, said first and second fish bearing measuring apparatus, said carrying cable being suspended from the end of a tow cable, a vertically downward pulling member connected to the bottom end of said carrying cable, said pulling member including a diving wing having a weighted fuselage provided on both sides with ailerons at a negative angle of incidence, said first and said second fish being fastened at a given distance apart in a central region of said carrying cable in such a manner that the measurements of the measuring apparatus are not affected on the one hand by the tow cable or on the other hand by the pulling member.

2. A towed device according to claim 1, further comprising a plurality of streamlined fins placed on said carrying cable to constitute a flexible vertical wing decreasing the drag of said carrying cable, the streamlined fins being placed on both sides of said first and second fish and between said first and second fish, the height of each of the fins being such that said carrying cable provided with the fins can be wound or coiled on board a tow vessel.

3. A towed device according to claim 2 comprising a relatively flexible system for securing each said fish on said carrying cable, said flexible system being a system of revolution to provide a slight drag.

4. A towed device according to claim 3 wherein said system for securing each said fish includes a tow head and a flexible connecting neck connecting the rear of said head to the front of said fish, said head including two half shells connected along a vertical diametral plane, the front of the head being spherical, its central portion being cylindrical, and its rear portion tapering to provide continuity with said connecting neck, each half shell having semi-cylindrical vertical hollow spaces providing for the passage of cables through the securing system at the rear of the spherical portion and a horizontal axial semi-cylindrical hollow space providing for the passage of an electric cable connecting said fish to the tow cable, said electric cable following practically the same path as the carrying cable through the fins and the connection of said neck to the head, the horizontal hollow space opening into at least one vertical hollow space.

5. A towed device according to claim 1 wherein the ends of the ailerons of the diving wing are provided with vertical stabilizing surfaces.

6. A towed device according to claim 1 comprising a relatively flexible system for securing each said fish on said carrying cable, said flexible system being a system of revolution to provide a slight drag.

* * * * *